United States Patent [19]

Crochemore et al.

[11] 4,132,703
[45] Jan. 2, 1979

[54] STABILIZATION OF VINYL CHLORIDE POLYMERS BY MEANS OF LACTONE COMPOUNDS

[75] Inventors: Michel M. Crochemore, Oullins; Michel M. Gay, Lyon, both of France

[73] Assignee: Rhone-Poulenc Industries, Paris, France

[21] Appl. No.: 731,435

[22] Filed: Oct. 12, 1976

[30] Foreign Application Priority Data

Oct. 14, 1975 [FR] France .................. 75 31949

[51] Int. Cl.² .................. C07D 309/30; C08K 5/09; C08K 5/15
[52] U.S. Cl. .................. 260/45.8 A; 252/400 R; 252/407; 260/23 XA; 260/45.75 W; 260/45.85 R
[58] Field of Search .................. 260/45.8 A, 23 XA; 252/400 R, 407

[56] References Cited

U.S. PATENT DOCUMENTS

| | | | |
|---|---|---|---|
| 2,595,636 | 5/1952 | Brighton et al. | 260/45.8 A |
| 2,971,962 | 2/1961 | Hawthorne et al. | 260/45.8 A |
| 3,061,583 | 10/1962 | Huhn et al. | 260/45.8 A |
| 3,223,660 | 12/1965 | Pulver et al. | 260/45.8 A |
| 3,644,573 | 2/1972 | Barkey et al. | 260/45.8 A |

*Primary Examiner*—Donald E. Czaja
*Assistant Examiner*—R. A. White
*Attorney, Agent, or Firm*—Bacon & Thomas

[57] ABSTRACT

The stabilization of polyvinyl chloride resins and polyvinyl chloride resin compositions with novel compositions comprising metal salts of carboxylic acids and an α-acyl-lactone of the formula:

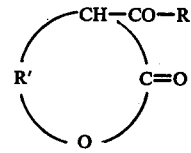

wherein R represents an aliphatic or aromatic radical containing 2 to 30 carbon atoms, R' represents a linear or branched-chain hydrocarbon radical having from 2 to 30 carbon atoms or a divalent cyclic radical having 4 to 10 carbon atoms.

12 Claims, No Drawings

STABILIZATION OF VINYL CHLORIDE POLYMERS BY MEANS OF LACTONE COMPOUNDS

BACKGROUND OF THE INVENTION

1. Field of the Invention

The present invention relates to stabilization of polyvinyl chloride resins and polyvinyl chloride resin compositions and further relates to stabilized resins.

2. Description of the Prior Art

Halogen-containing polymers, sych as polyvinyl chloride homopolymers and copolymers, are useful because of their desirable physical properties. During their fabrication into plastic sheets, rigid bodies, and the like, vinyl resins, however, are susceptible to discoloration due to heat degradation. This is especially troublesome in the course of compounding these resins at elevated temperatures. At these temperatures, which can be as high as 180 to 200° C, such resins are susceptible to heat degradation which is manifested in discoloration and loss in mechanical properties.

Many heat stabilizers are known to the art. Among the more important heat stabilizers in commerical use are metal chelates of dicarbonyl compounds or mixtures of metal chelates of dicarbonyl compounds with salts of carboxylic acids of calcium, lead and cadmium such as disclosed in U.S. Pat. Nos. 2,307,075 and 2,669,548. Salts of heavy metals and higher fatty acids have also been used in combinations with organic phoshites (U.S. Pat. No. 2,564,646) or with polyols (U.S. Pat. No. 2,711,411). Although these compounds have been successful in providing good stability, many of these compounds impart or do not entirely prevent an early yellow discoloration to the resin, which is manifested before severe heat deterioration occurs. This early discoloration has not been considered disadvantageous for many uses and the efforts of most research in this field has been directed towards minimizing the onset of the more serious heat deteriorations, i.e., blackening which occurs during long heating as in certain continuous milling operations. However, because of this early discoloration and accompaying haziness or cloudiness that may also appear, it has not been possible in all cases to obtain a substantially clear and colorless polyvinyl chloride resin composition. Therefore, a need exists in the polyvinyl chloride resin art for a stabilizer composition when added to polyvinyl chloride homopolymer and copolymer resin compositions which will impart to the resins the desired combination of heat and light stability, clarity, transparency, compatability, resistance to exudation and other valuable properties.

SUMMARY OF THE INVENTION

Novel stabilizer compositions for polyvinyl chloride resins and polyvinyl chloride resins compositions are provided according to the present invention which comprises (a) 0.1 to 5 weight percent of at least on divalent metal salt of a carboxylic acid and (b) 0.05 to 5 weight percent of an organic compound containing at least one α-acyl-lactone group of the formula:

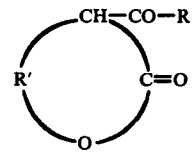

wherein R represents an aliphatic radical of 2 to 30 carbon atoms or an aromatic radical and R' represents a divalent linear or branched-chain hydrocarbon radical having from 2 to 30 carbon atoms, or a divalent cyclic radical, having 4 to 10 carbon atoms, said percentages being based on the weight of said resin.

It is therefore an object of the present invention to provide stabilizers that when added to polyvinyl chloride resin or polyvinyl chloride resin compositions will protect the resin from thermal degradation for a prolonged period of time.

It is a further object of the present invention to provide polyvinyl chloride resin or polyvinyl chloride resin compositions which are stabilized against the effects of thermal degradation and discoloration without loss of mechanical properties.

It is still another object of the present invention to provide stabilized polyvinyl chloride resin and polyvinyl chloride resin compositions which have unusual clarity and are particularly useful where transparency is a desirable feature and do not exhibit exudation.

Other objects and advantages of the present invention will become apparent from the detailed description that follows.

DESCRIPTION OF THE PREFERRED EMBODIMENTS

The polymers which may be heat-stabilized in accordance with this invention may typically be those which contain chlorine atoms bonded to the polymer chain. These polymers may be homopolymers including polyvinyl chloride-type polymers, e.g., polyvinyl chloride, polyvinylidene chloride, etc. They may also include copolymers formed by the copolymerization of vinyl chloride or vinylidene chloride with other ethylenically unsaturated monomers. Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc.. These polymers are herein called polyvinyl chloride for convenience. The copolymers useful in the practice of this invention are those prepared from at least 50 weight percent of vinyl chloride and preferably contain at least 80 weight percent of vinyl chloride. The invention is also suitable for postchlorinated polyvinyl chloride, containing from 65 to 70 weight percent chlorine, which is particularly sensitive to heat degradation at high temperatures. The invention is also applicable to mixtures of polyvinyl chloride in major proportion with a minor proportion of such other synthetic resins as chlorinated polyethylene, polyacrylate and polymethacrylate esters, and copolymers of acrylonitrile, butadiene and styrene.

The present invention is applicable to rigid polyvinyl chloride compositions, that is, compositions that are formulated to withstand temperatures of at least 200° C, as well as to plasticize polyvinyl chloride compositions of conventional formulations, which do not have high softening points. The latter compostions may contain any of the well-known plasticizers for polyvinyl chloride resins, for example, dioctyl phthalate, dibutyl sebacate, tricresyl phosphate and octyl diphenyl phosphate.

The vinyl chloride polymers can also contain lubricating agents such as stearic acid, pigments, fillers, etc.

A total of 0.15 to 10 weight percent of the combined stabilizer composition based on the total weight of the polymer can be used. More stabilizer compositions can be used, but usually no better results are obtained, and therefore such amounts are uneconomical. Less stabilizer can be used but it is not likely to accomplish the desired degree of stabilization.

The metal salts of organic carboxylic acids which can be employed in the practice of this invention are divalent metal salts, such as lead and zinc salts and include alkaline earth metal salts such as barium and calcium, derived from saturated or unstaurated aliphatic carboxylic acids having from 2 to 20 carbon atoms or metal salts derived from aromatic carboxylic acid. Particularly advantageous results have been obtained according to this invention using salts prepared from monocarboxylic acids containing from 2 to 18 carbon atoms, for example, acetic acid, propionic avid, hexanoic acid, 2-ethylhexanoic acid, octanoic acid, isooctanoic acid, capric acid, nonanoic acid, 3,5,5-trimethyl hexanoic acid, undecyclic acid, lauric acid, myristic acid, palmitic acid, oleic acid, chlorocaproic acid, hydroxycaproic, ethylacetoacetic acid, or from normally occuring mixtures of these acids, such as tallow fatty acids, coconut oil fatty acids, tall oil fatty acids, soy bean fatty acids, and cotton seed oil fatty acids. The divalent metal salts derived from aromatic carboxylic acids which can be employed include benzoic acid and substituted benzoic acids such as ethylbenzoic acid, phenylacetic acids, butylbenzoic acid, hexylbenzoic acid, salicylic acid, naphthenic acids derived from petroleum, hexahydrobenzoic acid and methylfuroic acid, as well as, partially esterified dibasic acids such as monobutylphthalate, isooctyl maleate, and ethyl gylcol maleate. Metal salts of polycarboxylic acids typified by malonic acid, succinic acid, glutaric acid, adipic acid, pimelic acid, suberic acid, azelaic acid, sebacic acid, etc. can also be employed.

The organic compounds that can be used in the stabilizer mixtures in combination with the metal salts of organic carboxylic acids described above can be monolactones or polylactones containing a ring having from 5 to 9 members and an acyl substituent in the alpha position to the lactone group. These compounds are represented by the formula:

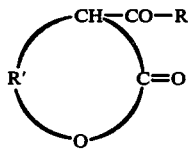

wherein R represents an aliphatic radical of 2 to 30 carbon atoms or an aromatic radical and R' represents a divalent linear or branched-chain hydrocarbon radical having 2 to 30 carbon atoms, or a divalent cyclic radical having 4 to 10 carbon atoms. A preferred group of lactones have the formula wherein the R' represents a radical of the formula:

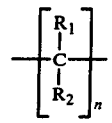

wherein n is an integer from 2 to 6, and $R_1$ and $R_2$ can be independently selected from the group consisting of hydrogen, alkyl, aryl, alkylaryl, arylalkyl, cycoaliphatic, an alkyl or an aryl radical containing hetero atoms and/or functional groups and wherein two of the adjacent radicals represented by $R_1$ and/or $R_2$ together with the two adjacent carbon atoms to which they are attached can form a ring fused to the lactone ring. As exemplary of the α-acyl lactones useful in this invention are the following: α-acyl-butyrolactones, α-acyl-valerolactones, α-acyl-caprolactones or α-acyl-benzofuranones or α-acyl-dihydrocoumarins. Suitable monolactones include α-acyl-butyrolactones, -α-propionyl-butyrolactones, α-benzoyl-butyrolactones, α-aceto-γ-valerolactones, α-aceto-δ-valerolactones, α-acyl-γ-phenyl-butyrolactones, 3-acyl-benzohydrofuran-2-ones and α-acyl-dihydro-coumarins such as 3-acetyl-3,4-dihydrocoumarin or 3-benzoyl-3,4-dihydrocoumarin. It is also within the scope of this invention to use compounds which have two or more α-acyl-lactone groups joined to one another by an aliphatic or aromatic hydrocarbon chain containing herero-atoms or other functional groups.

The lactones that can be employed in the stabilizer mixtures can be preapred by various methods, depending upon the desired lactone. The α-substituted lactones can be obtained by acylation of other lactones. This is accomplished by reacting a previously prepared lactone with an acid halide or with an ester in accordance with the process of Reppe, Annalen der Chemie, 596, 183–185 (1955).

Another method for the preparation of α-acyl substituted lactones is to react an epoxide compounds with an ester of an acyl-acetic acid, such as methyl or ethyl acetoacetate or benzoylacetate, under the conditions described by Adams et al, Journal of the American Chemical Society, 72, 4,368 (1950). Likewise, compounds having two or more α-acyl-butyrolactone chains can be prepared from diepoxides or polyepoxides, and dilactones and polylactones can be synthesized from glycidyl ethers of diols, polyols, phenols diphenols, polyphenols under the conditions of the Adams et al process, supra.

The stablized vinyl chloride resin and vinyl chloride resin compositions may be prepared by any convenient procedure. It is generally preferred to blend the stabilizer with the vinyl chloride resin using plastic mixing rolls at a temperature at which the mix is fluid and to mill the composition on a two roll mill for a time sufficient to form a homogeneous sheet. It is equally preferred that the composition may also be homogenized in a malaxator. The plasticizer, if employed, and other additives may be incorporated with the stabilizer. The stabilized composition may then be removed from the mill in the form of a sheet or film of desired thickness which may be used as such or subjected to a polishing or embossing treatment. The resulting composition according to this invention can be employed with all techniques customary for processing compositions of polyvinyl chloride resins. For example, injection, extrusion, extrusion blowing, calendering, rotational molding, and the like.

The following examples are illustrative of the invention and provide a better understanding of its details and advantages. It is to be understood, however, that these examples are given solely for the purpose of illustration and that the invention is not to be regarded as being limited to any of the specific materials or conditions recited therein, except as set forth in the appended claims.

EXAMPLES 1 TO 5

A mixture of 1,000 g. of polyvinyl chloride powder (LUCOVYL RS 8,000 sold by Rhone-Poulenc Industries - France) of viscosity index 80 (standard specification NF T 51,013) 100 g. of a copolymer of butadiene, styrene and methyl methacrylate, 10 g. of a lubricating wax based on an ester of colophony (CIRE E, sold by HOECHST - Germany) 30 g. of epoxidized soya oil, 3 g. of tri-nonylphenyl phosphite, 10 g. of calcium stearate and 7 g. of zinc stearate were charged into a cylindrical ball mill. The ball mill was revolved for 15 hours on a roller mixer, and the resulting mixture (Mixture A) was used as the basis for comparison texts hereinbelow. Test specimens (designated as Nos. 1–5 in Table I) were produced by introducing 57 g. of Mixture A and a specific amount of the respective lactone stabilizer into 250 $cm^3$ separate powder mills containing porcelain balls. The powder mills were rotated on a roller mixer for 15 hours and the resulting specimen mixture was then calendered between rolls, heated to 180° C for 3 minutes to produce sheets. Rectangular samples of size 10 × 20 mm were cut from the calendered sheets and were placed in a ventilated oven which was maintained at a temperature of 180° C for the period of time indicated in Table I. The coloration of the samples is determined in accordance with the Gardner Scale, and with the aid of a Lovibond disc it ws possible to compare these colorations with those of typical samples. The results are shown in Table I below.

TABLE I

| Duration in minutes - temperature 180° C | | 0 | 7 | 14 | 21 |
|---|---|---|---|---|---|
| Comparison, (without lactone) | | 7 | 8 | 8 | 8 |
| 1. α-Benzoyl-butyrolactone (a) | 0.17 g. | 0 | 0 | 0 | 1 |
| 2. γ-Phenyl-α-acetyl-butyrolactone (b) | 0.16 g. | 0 | 0 | 0 | 1 |
| 3. α-Stearoyl-butyrolactone (c) | 0.15 g. | 0 | 0 | 0 | 0.5 |
| 4. α-Benzoyl-butyrolactone | 0.10 g. | 0 | 0 | 0.5 | 1 |
| 5. α-Acetyl-butyrolactone | 0.10 g. | 0 | 0 | 0 | 1 |

Sample (a) was prepared from butyrolactone and ethyl benzoate under the conditions of the Reppe article, supra.

Sample (b) was prepared from styrene oxide and ethyl acetoacetate under the conditions of the Adams et al article, supra.

Sample (c) was prepared from butylrolactone and methyl stearate under the conditions of the Reppe article, supra.

From the data in Table I, it can be seen that the compositions that contained the stabilizer combination of the present invention are superior in heat stability and clarity to the polyvinyl chloride resin composition that contains the comparative or conventional stabilizer alone.

EXAMPLES 6 and 7

A mixture consisting of 800 g. of polyvinyl chloride, 200 g. of a vinyl chloride/vinyl acetate copolymer having an acetate content of 15%, 100 g. of a butadiene/styrene/methyl methacrylate copolymer, 30 g. of epoxidized soya oil, 5 g. of CIRE E, 5 g. of calcium stearate and 2.5 g. of zinc stearate were prepared in accordance with Example 1. Into a powder mill, 57 g. of this resulting mixture were introduced, the lactone stabilizer was added, and samples were prepared as in Example 1. The samples were placed in a ventilated oven at 170° C. The samples were removed and evaluated as described in Example 1. The heat stability ratings of the compositions are given in Table II.

TABLE II

| Duration in minutes -temperature 170° C | | 0 | 7 | 14 | 21 |
|---|---|---|---|---|---|
| Comparison, without lactone | | 1 | 4 | 5 | 6 |
| 2-Acetyl-butyrolactone | 0.10 g. | 0 | 0 | 1 | 3 |
| 2-Benzoyl-butyrolactone | 0.20 g. | 0 | 0 | 1 | 2 |

EXAMPLE 8

This example illustrates the heat stabilization of a chlorinated polyvinyl chloride.

A mixture of 1,000 g. of a chlorinated polyvinyl chloride, having a chlorine content of 65%, 10 g. of CIRE E, 15 g. of calcium stearate and 1.5 g. of zinc stearate were prepared. 0.40 g. of α-benzoyl-butyrolactone were added to 57 g. of this mixture and 2 mm thick sheets are then prepared on a calender at 190° C. The specimens are placed in a ventilated oven at 180° C. The heat stability test results are given in Table II below.

TABLE III

| Duration in minutes - temperature 190° C | 0 | 7 | 14 |
|---|---|---|---|
| Comparison composition (without lactone) | 11 | 13 | 18 |
| Stabilized composition (α-benzoyl-butyrolactone) | 9 | 10 | 11 |

From the data in Table III it is seen that with the chlorinated polyvinyl chloride polymer, the addition of the stabilizer according to this invention has a prolonged effect compared to the conventional stabilizer on a polyvinyl chloride composition very susceptible to heat degradation.

EXAMPLES 9 TO 11

These examples illustrate the stabilizing activity of a dilactone in a polyvinyl chloride composition (Mixture A) of Example 1. The specimens, containing stabilizers comprising the dilactone compounds of the formula given below in Table IV, were prepared following the procedure of Example 1. The results are given in Table IV below.

TABLE IV

| Duration in minutes | 0 | 7 | 14 | 21 |
|---|---|---|---|---|
| - Comparison (without lacetone) | 7 | 8 | 8 | 8 |
| (d) 0.25 g. | 0 | 0 | 0 | 1 |

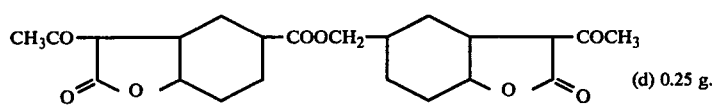

TABLE IV-continued

| Duration in minutes | | 0 | 7 | 14 | 21 |
|---|---|---|---|---|---|

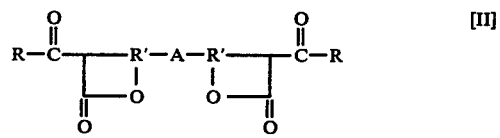

(e) 0.15 g.   0  0  0  1

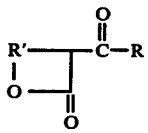

(f) 0.15 g.   0  0  0  1

Sample (d) was prepared by reaction of ethyl acetoacetate with 3,4-epoxy-cyclohexylmethyl-3,4-epoxy-cyclohexane carboxylate under the conditions of the Adams article, supra.

Sample (e) was prepared according to the Adams method, from ethyl acetoacetate and the diglycidyl ether of 2,2-bis-(4-hydroxyphenyl)-propane.

Sample (f) was prepared from ethyl acetate and the diglycidyl ether of butane-1,4-diol.

The results clearly indicate that the lactone compounds synergistically cooperate with the known divalent metal salts of organic carboxylic acids to improve resistance to early discoloration and to prolong heat stabilization effects to provide polyvinyl chloride resin and polyvinyl chloride resin compositions which have unusual clarity and are particularly useful where transparency is a desirable feature.

What is claimed is:

1. A stabilizer composition for polyvinyl chloride resin compositions comprising (a) 0.1 to 5 weight percent based upon the weight of the resin of at least one divalent metal salt of an organic carboxylic acid and (b) 0.05 to 5 weight percent based upon the weight of the resin of at least one α-acyl-lactone selected from the group consisting of those having the formula:

$$\begin{array}{c} \text{R}'\!\!-\!\!\!\overset{|}{\underset{O\longrightarrow\underset{\|}{O}}{\text{C}}}\!\!-\!\!\overset{\overset{O}{\|}}{\text{C}}\!-\!\text{R} \end{array} \quad [I]$$

said lactone ring being from 5- to 9-membered; wherein R is selected from the group consisting of an aliphatic hydrocarbon radical having from 2 to 30 carbon atoms and phenyl; and R' is a polymethylene bridge of the formula:

$$\left[\begin{array}{c} R_1 \\ | \\ -C- \\ | \\ R_2 \end{array}\right]_n$$

Wherein n is an integer from 2 to 6, $R_1$ and $R_2$ are independently selected from the group consisting of hydrogen, alkyl, aryl, arylalkyl and cycloaliphatic, and wherein any $R_1$ or $R_2$ depending from any given methylenic carbon in the bridge may, together with any $R_1$ or $R_2$ depending from an adjacent methylenic carbon in the bridge, be joined to form a carbocyclic ring fused to the lactone ring, and further wherein the total number of carbon atoms in said polymethylenic bridge ranges from between 2 to 30; and those having the formula:

$$\text{R}\!-\!\!\overset{\overset{O}{\|}}{\text{C}}\!\!-\!\!\!\overset{|}{\underset{O\longrightarrow\underset{\|}{O}}{\text{C}}}\!\!-\!\!\text{R}'\!-\!\text{A}\!-\!\text{R}'\!\!-\!\!\!\overset{|}{\underset{\longrightarrow\! O\underset{\|}{O}}{\text{C}}}\!\!-\!\!\overset{\overset{O}{\|}}{\text{C}}\!-\!\text{R} \quad [II]$$

wherein each R and R' is as defined above, and A is a member selected from the group consisting of a divalent aliphatic radical, a divalent aromatic radical, an oxygen atom interrupted divalent aliphatic radical, a carboxyl interrupted divalent aliphatic radical, and an oxygen atom interrupted divalent aromatic radical, and further wherein the total number of carbon atoms in the radicals R' and A does not exceed 30 and each of the lactone rings comprising the lactone of the formula being from 5- to 9-membered.

2. The stabilizer composition as defined by claim 1, wherein the at least one α-acyl-lactone has the formula.

3. The stabilizer composition as defined by claim 2, wherein the at least one α-acyl-lactone is a member selected from the group consisting of α-acyl butyrolactone, α-acyl valerolactone, α-acyl coprolctone, benzofuranone, and dihydrocoumarin.

4. The stabilizer composition as defined by claim 3, wherein R is selected from the group consisting of alkyl and phenyl.

5. The stabilizer composition as defined by claim 3, wherein the at least one α-acyl-lactone is α-acyl-butyrolactone.

6. The stabilizer composition as defined by claim 3, wherein the at least one α-acyl-lactone is a member selected from the group consisting of α-acyl-butyrolactone, α-acyl-benzoyl-butyrolactone, γ-phenyl-α-acetyl-butyrolactone, and α-stearoyl-butyrolactone.

7. The stabilizer composition as defined by claim 1, wherein said divalent metal salt is selected from the group consisting of barium, cadmium, calcium or zinc slats of organic carboxylic acids having from 2 to 20 carbon atoms.

8. A heat stabilized polyvinyl chloride resin composition comprising a polyvinyl chloride polymer and said stabilizer composition of claim 1.

9. The heat stabilized polyvinyl chloride resin composition as defined by claim 8, wherein said polyvinyl chloride polymer is a homopolymer.

10. The heat stabilized polyvinyl chloride resin composition as defined by claim 8, wherein said polyvinyl chloride polymer is a copolymer containing at least 50 weight percent of vinyl chloride.

11. The stabilizer composition as defined by claim 1, wherein the at least one α-acyl-lactone has the formula.
12. The stabilizer composition as defined by claim 11, wherein the at least one α-acyl-lactone is a member selected from the group consisting of:
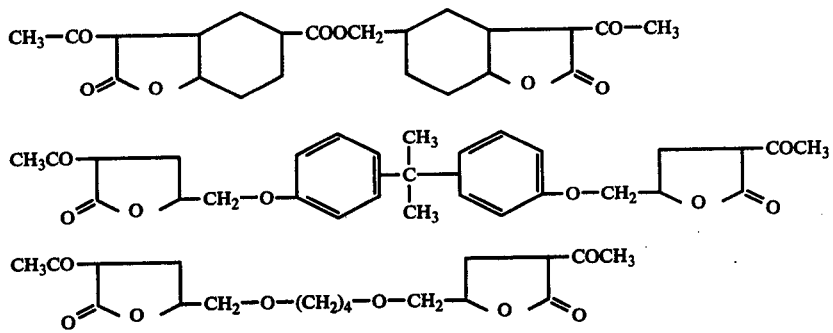
* * * * *